United States Patent

Mangold

[11] Patent Number: 5,902,112
[45] Date of Patent: May 11, 1999

[54] SPEECH ASSISTED LEARNING

[76] Inventor: Sally S. Mangold, 20102 Woodbine Ave., Castro Valley, Calif. 94546

[21] Appl. No.: 08/901,563

[22] Filed: Jul. 28, 1997

[51] Int. Cl.⁶ .................................................. G09B 21/00
[52] U.S. Cl. ......................... 434/112; 434/113; 434/114; 434/116; 340/825.19
[58] Field of Search ..................... 434/112–117, 307 R, 434/308, 317, 322, 323; 340/825.19, 825.79; 400/109, 109.1

[56] References Cited

U.S. PATENT DOCUMENTS

| | | | |
|---|---|---|---|
| 4,037,200 | 7/1977 | Crammer | 340/825.19 |
| 5,217,378 | 6/1993 | Donovan | 434/116 |
| 5,725,379 | 3/1998 | Perry | 434/113 |

*Primary Examiner*—Glenn E. Richman
*Attorney, Agent, or Firm*—Linval B. Castle

[57] ABSTRACT

A braille teaching tool that audibly pronounces each braille character as it is touched by the student is comprised of a touch pad having a rectangular matrix of touch sensitive areas each connected to a processor with memory for identifying each sensitive area of each sheet of braille placed on the touch pad. The processor is coupled to a speech synthesizer for pronouncing the braille character.

8 Claims, 1 Drawing Sheet

SPEECH ASSISTED LEARNING

This invention relates to the teaching of braille and specifically to an electronic machine that synthesizes the pronunciation of a braille character in response to the light tactic pressure on the braille character on a sheet on a pressure pad of the machine.

BACKGROUND OF THE INVENTION

Many people are blind, either from birth or resulting from an accident or illness, and are unable to read in the conventional manner. They are able to verbally communicate and can listen to recordings of great books, but they are unable to communicate in writing except by the use of braille, a system in which each character is comprised of a pattern of raised dots which are sensed by touch of the finger. The braille characters, the alphabet, numbers and punctuation, are formed by a maximum of six raised dots in two columns and three rows embossed on a sheet of paper and arranged in a rectangular cell.

Learning to read braille is difficult for many people. A blind person may learn to distinguish each character on the page, but applying any meaning to it is sometimes difficult. Visual readers can learn quickly to recognize words and grasp the meaning of a sentence at a glance, but a braille student must retain everything by memory until words and sentences are comprehended. A braille student normally requires many hours of assistance from a sighted reader to learn to translate braille characters into the spoken equivalent. That is the function of the present invention—to translate braille characters into the spoken words.

Briefly described, the invention is for a system that includes a touch pad that supports a sheet of braille characters which are to be sensed by the pressure on them. The braille sheet is identified by a bar code which is read by a code reader on the pressure pad and the braille sheet identification is applied to a program memory which provides a map location of the braille sheet and identifies each braille character as its position is touched. The microprocessor then activates a speech synthesizer which audibly pronounces the braille character.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
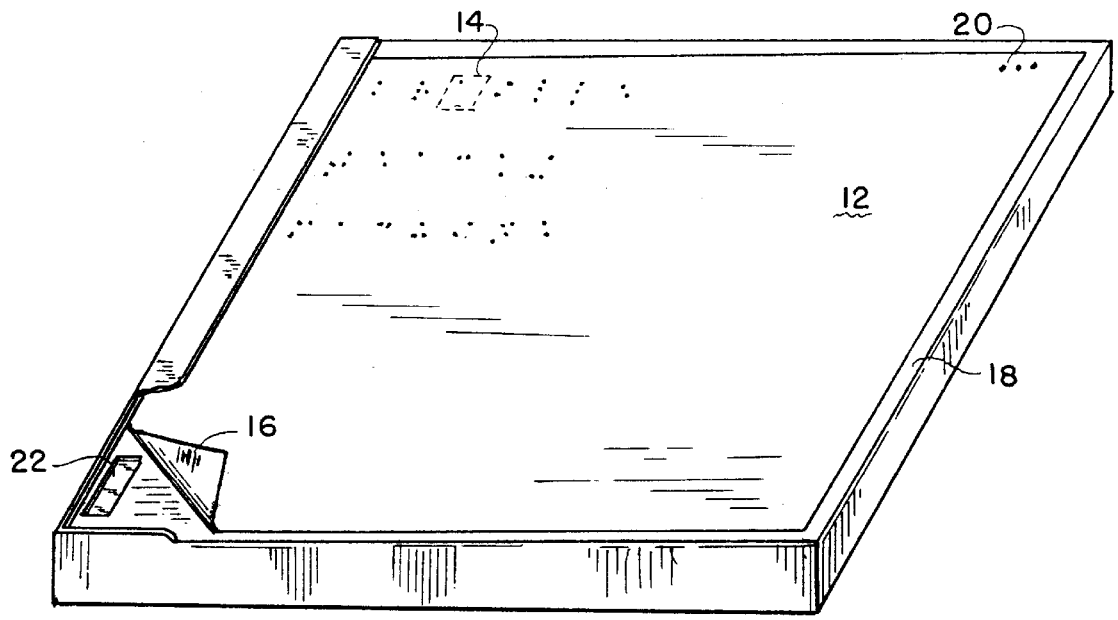
FIG. 1 is a perspective view of the touch pad with a typical sheet of braille characters to be translated into audible pronunciations.

The braille system contains 63 dot patterns or characters, each character comprised of a maximum of six small raised dots arranged in three rows of two columns in cells 14 embossed on a paper sheet 12, as shown in FIG. 1. The positions and number of the raised dots in each cell 14 represent a certain braille character, and the delicate sense of touch developed by a blind person can detect the position and shape of each raised dot which is used for reading and correspondence.

The sheets of braille characters used in the braille teaching machine of the invention represent the alphabet, numbers, punctuation and abbreviations. Each different sheet is identified by a unique bar code 16 written on a bottom corner on the back of the sheet. A sheet of braille characters is inserted upon the touch pad 18 of the teaching machine with an alignment mark, such as a group of raised dots 20, at a predetermined location such as, for example, the upper right corner of the sheet 12, so that the sheet may quickly and easily be oriented on the touch pad 18 with the bar code 16 overlying a code reader 22 built into the edge of the touch pad.

Figure 2:
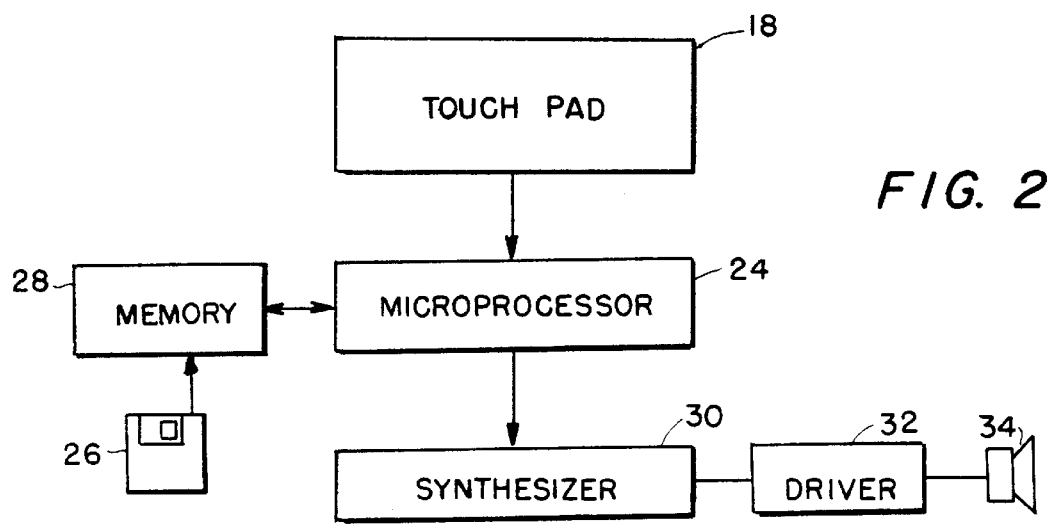
FIG. 2 is a block diagram of the braille teaching machine that translates the braille into audio pronunciations.

The coded sheet 12 containing a plurality of the cells 14 of braille characters is placed upon a touch pad 18 of the teaching machine. Touch pad is approximately eleven inches square and contains a rectangular matrix of touch sensitive sensors corresponding to the location of each cell of braille so that a light pressure on the braille character on the coded sheet 12 will signal that location to a microprocessor 24 illustrated in the block diagram of FIG. 2.

A program disk 26 containing pre-programmed location maps indicating the location of each braille character on each sheet of braille identified by the bar code 16 is entered into a memory 28 coupled to the microprocessor 24. The microprocessor also receives the sheet identification from a bar code reader 22 located to read the bar code 16 on the bottom surface of the sheet 12 and identifies the proper location map in the memory 28. In response to the signals received from touch pad 22 and identified in the program map in the memory 28, the microprocessor 24 is then ready to translate into speech signals from the braille cells pressed on the various locations on the touch pad 22.

A speech synthesizer 30 is coupled to the output of the microprocessor 24. The synthesizer 30 generates the speech translated in the microprocessor 24 and audibly produces the speech signals produced therein through the driver 32 and speaker 34.

I claim:

1. A machine for aiding the teaching of braille by producing synthesized pronunciations of various braille characters embossed on a sheet, said machine comprising:

a touch pad having a rectangular matrix of touch sensitive areas, the light pressure on each of said areas producing an output signal, said touch pad including code reading means for reading an identification code assigned exclusively to an overlying sheet having braille characters arranged in a rectangular matrix corresponding to the rectangular matrix of touch sensitive areas of said touch pad;

a memory containing a location map identifying a braille character at each of said touch sensitive areas for each sheet identification code;

a microprocessor coupled to said memory and to said touch pad and responsive to pressure applied to each of said touch sensitive areas, to said code reading means and to said location map of each braille character stored in said memory, said microprocessor for applying said identification code to said memory and for producing discrete output signals representing each differing braille character pressed on said touch pad; and an audio producing means coupled to said microprocessor and responsive to said discrete output signals for pronouncing each braille character pressed on said touch pad.

2. The braille teaching machine claimed in claim 1 wherein said audio producing means includes an audio synthesizer and a speaker.

3. The braille teaching machine claimed in claim 1 including a sheet of paper containing a plurality of braille characters arranged in a rectangular matrix, said sheet further including an identification code that is unique to the arrangement of braille characters on the sheet.

4. The braille teaching machine claimed in claim 3 further including means in a predetermined location of said sheet for aiding in orienting said sheet on said touch pad.

5. The braille teaching machine claimed in claim 1 further including data entering means coupled to said memory for entering programs representing braille location maps into said memory.

6. The braille teaching machine claimed in claim 5 wherein said data entering means is a magnetic memory disk.

7. A method for aiding the learning of braille, said braille being embossed in a rectangular matrix of braille characters a on paper sheet, the method comprising the steps of:

providing a touch pad having a plurality of individual touch sensitive areas in a rectangular matrix corresponding to the matrix of braille characters on the paper sheet;

supplying a memory programmed with a map of the location of each braille character on said sheet;

coupling said memory and each of said individual touch sensitive areas to a microprocessor for the production of an output signal representing a touched braille character upon a touched sensitive area on said touch pad; and synthesizing the pronunciation representing said touched braille character.

8. The method claimed in claim 7, including the further steps of:

printing an identification code on said sheet, said code identifying the arrangement of braille characters on said sheet; and providing a identification code reader on said touch pad, said code reader being aligned with said printed code, said code reader coupled to said microprocessor.

* * * * *